Dec. 26, 1961     L. G. BOLI     3,014,639
HIGH PRESSURE AIR COMPRESSOR
Filed Sept. 6, 1957     2 Sheets-Sheet 1

LOUIS G. BOLI,
INVENTOR.

BY
*Herschel C. Omohundro*
Attorney.

LOUIS G. BOLI, INVENTOR.

United States Patent Office

3,014,639
Patented Dec. 26, 1961

3,014,639
HIGH PRESSURE AIR COMPRESSOR
Louis Gwinner Boll, Scottsdale, Ariz., assignor to The Garrett Corporation, Los Angeles, Calif., a corporation of California
Filed Sept. 6, 1957, Ser. No. 682,417
6 Claims. (Cl. 230—57)

This invention relates generally to compressors, and is directed more particularly to high pressure air compressors suitable for use in aircraft.

It has been found that hydraulic and/or electrical equipment, usually employed in modern aircraft to actuate controls, landing gear and other devices, may be deleteriously affected and fail to function properly, due to the high temperatures resulting from high speed flight. It has also been found that devices actuated by compressed air at high pressures may be less susceptible to failure because of the heat and are, therefore, suitable replacements for the equipment usually employed. When such replacements are made, it becomes necessary to provide a suitable source of air under high pressure.

An object of this invention, therefore, is to provide an air compressor which will efficiently attain substantially isothermal compression of air.

Another object of the invention is to provide a high pressure air compressor which is compact relative to its capacity and functions.

Another object of the invention is to provide a compact high pressure air compressor which is particularly adapted to be operated pneumatically by bleed air from an aircraft main engine compressor.

Another object of the invention is to provide a high pressure air compressor which attains substantially isothermal compression of air by transferring the heat of compression from said air to cooling air exhausted from a pneumatic motor driving the compressor.

A further object of the invention is to provide a compressor which is cooled by the exhaust from a pneumatic motor used to drive the same, whereby the compressor may be used in high speed aircraft subject to ram air temperatures which are too high to permit the ram air to be used for compressor cooling.

Figure 1:
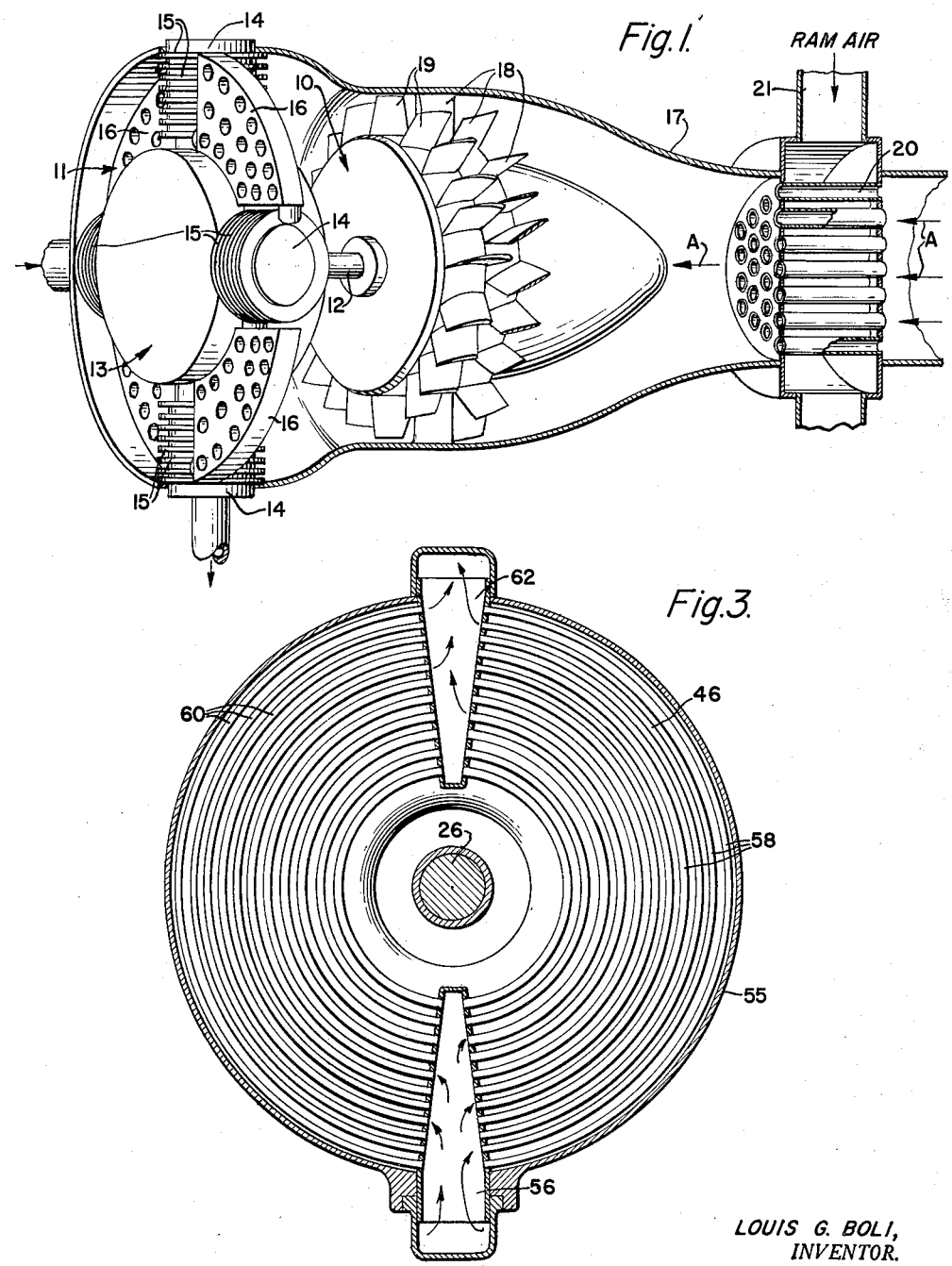
Figure 2:
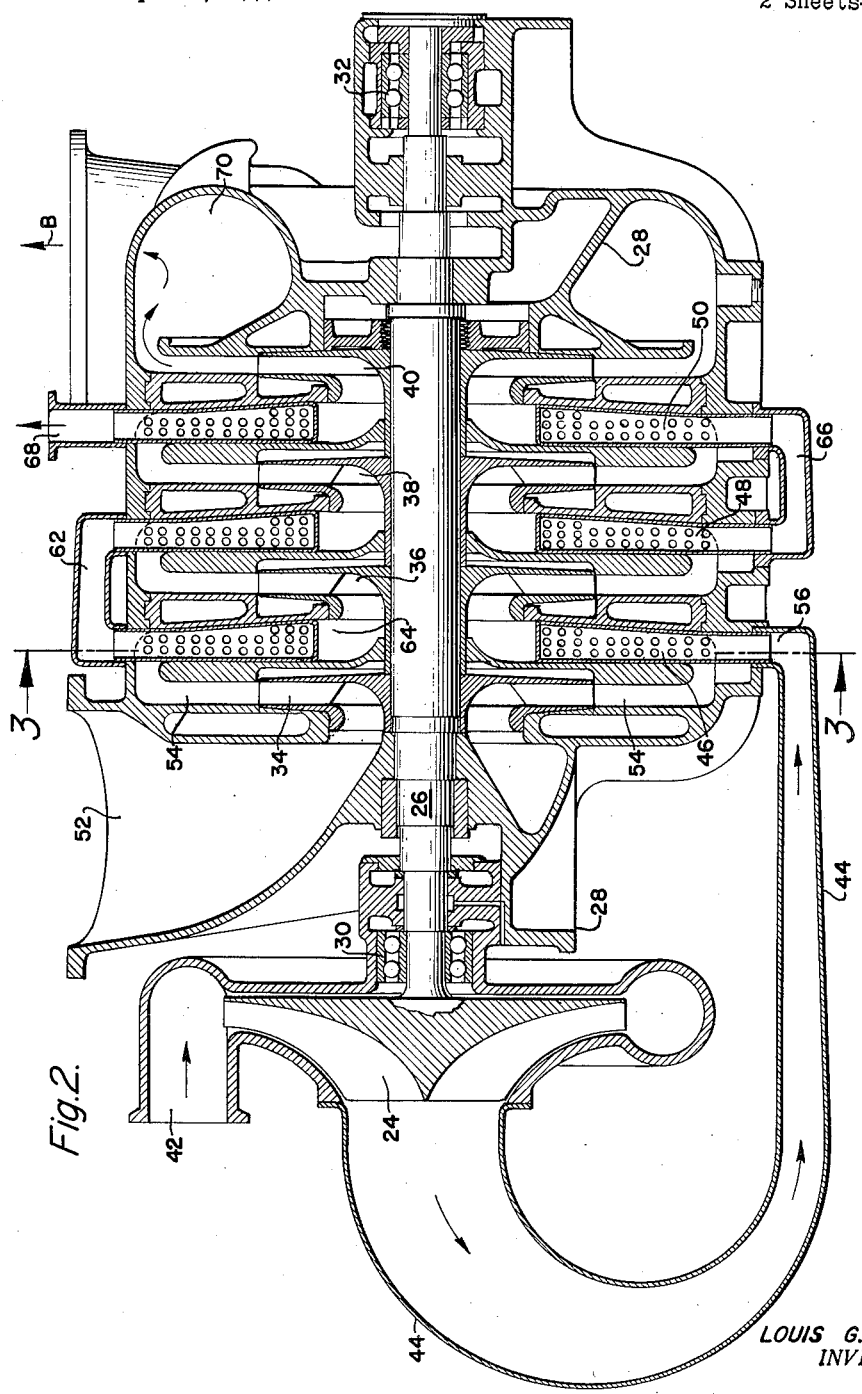

Other objects and advantages of the invention may be apparent from the following specification, appended claims and accompanying drawings, in which:

FIGURE 1 of the drawing is a diagrammatic view of an air compressor constructed in accordance with the present invention, portions being broken away to expose hidden structure;

FIG. 2 is a longitudinal sectional view of a centrifugal compressor embodying the principles of the invention; and FIG. 3 is a sectional view taken on line 3—3 of FIG. 2.

The high pressure air compressor shown in FIG. 1 of the drawing, employs an air turbine driving means and a multi-stage piston type compressor means. It will be obvious to those skilled in the art that the turbine is only one configuration of many well known pneumatic motors which may be employed to carry out the invention, and that the piston compressor may be considered the equivalent of other well known compressors; for example, a multi-stage centrifugal compressor as shown in FIG. 2. It will therefore be understood that the invention embodies a pneumatic motor coupled to a high pressure air compressor, and that the expanded fluid exhausted from the pneumatic motor is subsequently used to cool the compressor, so that heat of compression is transferred from the compressed air passing through the compressor to the cooled air or other elastic fluid exhausted from the pneumatic motor. This combination of elements is particularly advantageous in aircraft installations wherein the pneumatic motor may be driven by high pressure air bled from an aircraft main engine compressor.

Referring, by way of example, to FIG. 1 of the drawing, it will be seen that the rotor of pneumatically operated turbine motor 10 is coupled to a multi-stage piston compressor 11 by means of a shaft 12. The compressor 11 is provided with a gear case 13 which contains suitable reduction gearing and crank mechanism for operating pistons in cylinders 14 of the compressor to effect the compression of air. The cylinders 14 are provided with external fins 15 which transfer heat of compression and friction from the compressor to the surrounding atmosphere. As shown, the cylinders 14 constitute successive compression stages of a multi-stage compressor. Heat exchangers or intercoolers 16 are disposed between adjacent cylinders 14 and communicate therewith to provide passages for compressed air between the discharge of one stage and the inlet of the next stage of the compressor. These heat exchangers also serve to cool the compressed air passing through the various stages of the compressor. Cylinders 14 and heat exchangers 16 are surrounded by a conduit 17, which forms an exhaust passage for the turbine 10 and conducts cooling air therefrom over the cylinders 14 and heat exchangers 16. Positioned in the conduit 17 upstream of the turbine 10 is an annular row of stator vanes 18, which direct high pressure air into the blades 19 of the turbine 10 at desired angles.

Mounted within the conduit 17 upstream of the stator vanes 18 is a heat exchanger 20, which is arranged to cool the high pressure air preliminary to its entrance into the turbine 10. The conduit 17 may, for example, conduct high pressure bleed air from a main engine compressor at temperatures approaching 1,000° F. The heat exchanger 20 is provided with a cross flow inlet 21, which may, in such case, receive ram air at temperatures approaching 700° F. or more for example. Thus, hot engine bleed air may be cooled considerably by ram air in the heat exchanger 20 prior to the introduction thereof to the turbine 10.

The operation of the high pressure air compressor, shown in FIG. 1 of the drawings, is substantially as follows:

High pressure air passing through the conduit 17 in the direction indicated by arrows A, is precooled in the heat exchanger 20 by ram air and is then directed through the stator vanes 18 and against the blades 19 of the turbine 10, causing rotation of the turbine rotor and shaft 12 and the operation of compressor 11. Pistons, not shown, in the cylinders 14 of the compressor reciprocate and compress air in successive stages, the air passing from one cylinder 14 to the next, flowing through a heat exchanger 16 prior to being compressed to a higher pressure.

The load imposed upon the turbine 10 by operation of the compressor 11 causes work to be extracted from the high pressure fluid passing through the turbine, which lowers the thermal energy content of the fluid, while at the same time the fluid is expanded. The work extraction from the fluid and the expansion thereof cause a substantial reduction in its temperature. The fluid, when exhausted from the turbine 10, is directed by means of the conduit 17 over the fins 15 of the cylinders 14 and through the heat exchangers 16. The heat generated by mechanical friction and the compressing of fluid in the compressor is transferred to the cooling fluid exhausted from the turbine 10 by the fins 15 and heat exchangers 16.

The heat exchanger 20 is an optional device which may be used when the high pressure air supplied to the duct 17 is at a higher temperature than ram air, or when the design of the compressor, to meet certain requirements, dictates that the temperature of the high pressure air supply need be reduced.

The modification of the invention shown in FIGS. 2 and 3 of the drawings, employs a pneumatically operated centripetal type turbine which drives a multi-stage centrifugal compressor. Heat exchange means located between stages of the compressor receive cool fluid exhausted from the pneumatically operated turbine which drives the compressor.

In the form of the invention shown in FIG. 2 of the drawings, a pneumatic turbine wheel 24 is mounted on a shaft 26 supported in a frame 28 by bearings 30 and 32. Carried by the shaft 26 are centrifugal impellers 34, 36, 38 and 40, which form successive stages of a compressor driven by the wheel 24.

A conduit 42 is disposed to deliver high pressure pneumatic fluid from a suitable source, such as the compressor of an aircraft engine, to the inlet of the turbine 24. A conduit 44 is disposed to conduct fluid exhausted from the turbine to heat exchangers disposed between the stages of the compressor. These heat exchangers, or intercoolers, 46, 48 and 50 are disposed between the stages of the compressor to cool fluid being compressed therein, whereby substantially isothermal compression may be accomplished, as will be hereinafter described in detail.

The compressor is provided with an air inlet plenum 52 disposed to conduct air into the inlet of the impeller 34, which forms the first stage of the compressor. The outlet of the impeller 34 communicates with a diffuser 54, which extends radially outwardly from the impeller into communication with the interior of a plenum 55 forming a part of the heat exchanger 46. The plenum of the heat exchanger 46, as shown in FIG. 2 of the drawings, provides an air flow passage 64, which communicates with the diffuser 54 and the inlet of the impeller 36. Heat exchanger 46, as shown in FIG. 3 of the drawings, is provided with an inlet header 56, extending through the plenum 55. This inlet header receives cool air from the turbine exhaust conduit 44 and projects radially inwardly into the passage 64 and communicates with a plurality of groups of semicircular tubes 58 and 60, which, at their opposite ends, communicate with an outlet header 62. The outlet header projects through the plenum 55 and extends to the inlet of the heat exchanger 48, as will be hereinafter described. The heat exchanger 46 is so disposed that air flowing from the impeller 34 to the impeller 36 crosses the tubes 58 and 60. Thus, heat is transferred from the air being compressed in the compressor, between the first and second stages thereof, to cooling fluid exhausted from the turbine 24 into the conduit 44 and heat exchanger 46.

The construction of the heat exchangers 48 and 50 is similar to that of the heat exchanger 46, and these latter heat exchangers are disposed in compressor air flow passages between the impellers 36 and 38, and 38 and 40, respectively.

The outlet conduit 62 of the heat exchanger 46 conducts cooling fluid to the inlet of the heat exchanger 48, which is provided with an outlet conduit 66, communicating with the inlet of the heat exchanger 50. The heat exchanger 50 is provided with an outlet 68, which exhausts to the surrounding atmosphere.

It will be seen that the air being compressed by the compressor flows successively through the impeller 34, heat exchanger 46, impeller 36, heat exchanger 48, impeller 38, heat exchanger 50 and the impeller 40 into a compressed air outlet plenum 70, which delivers air under high pressure as indicated by arrow B to a point of use.

The operation of the modification of the present invention is similar to that described in connection with the structure shown in FIG. 1 of the drawings. When the compressor is expending energy, to increase the pressure ratio of air passing therethrough, work is extracted from fluid passing through the turbine 24, thereby causing a temperature drop in such fluid. Thus, the fluid in the conduit 44 is cool, and while it passes through the tubes 58 and 60 of the heat exchangers, as shown in FIG. 3 of the drawings, the heat of compression of the air passing through the compressor is exchanged to the fluid passing through the tubes 58 and 60, thereby permitting substantially isothermal compression.

It will be understood that the heat of compression may be somewhat proportional to the cooling capacity of the fluid exhausted from the turbine, since the work expended by the compressor imposes a corresponding loading of the turbine and the consequent reduction of temperature in the motive fluid as it passes through the turbine.

It will be obvious to those skilled in the art that utilization of the cool exhaust air, or other elastic fluid, from a pneumatic motor, to cool a compressor, provides for cooling capacity which is related to the amount of work done by the compressor, since the compressor is responsible for loading the turbine. This functional relationship of the turbine and compressor lends itself to the design of a high pressure air compressor which is very compact in proportion to its capacity, or which may be very efficient in proportion to the amount of pneumatic power utilized to compress a given amount of air to a very high pressure.

Various modifications of the present invention may be resorted to in a manner limited only by a just interpretation of the following claims.

I claim:

1. In a fluid compressor, the combination of: a motor of the fluid expansion operated type, said motor having an inlet and an exhaust outlet; a compressor having a plurality of stages and operably connected with said motor, said compressor being disposed within said exhaust outlet; and heat transfer means disposed between the stages of said compressor and within said exhaust outlet, said heat transfer means serving to pass compressed fluid into heat exchange relationship with the expanded cooling fluid flowing from the exhaust outlet of said fluid operated motor, whereby the heat of compression is transferred from said fluid being compressed to said expanded cooling fluid.

2. Fluid compressing apparatus comprising a shaft supported for rotary movement; a reaction type turbine rotor operatively connected with said shaft to drive the same in response to the application of compressed fluid to said rotor; multistage compressor means operatively connected with said shaft to be driven by and load said turbine rotor, a thermal reduction in the turbine actuating fluid resulting therefrom; and heat transfer means between the stages of said compressor means to pass fluid undergoing compression therein into heat exchange relationship with expanded fluid discharged from said turbine.

3. In a fluid compressor, the combination of: a motor of the fluid expansion operated type, said motor having an exhaust outlet; a compressor operatively connected with said motor, said compressor having a plurality of stages in which fluid is successively compressed; a heat exchanger between successive stages of said compressor, compressed fluid flowing from one stage to another passing through said heat exchangers; and means for directing expanded exhaust fluid from said motor through said heat exchangers for heat exchange relation with compressed fluid flowing therethrough.

4. In a fluid compressor, the combination of: a motor of the fluid expansion operated type, said motor having an exhaust outlet; a compressor operatively connected with said motor and disposed in said exhaust outlet, said compressor having a plurality of stages in which fluid is successively compressed; heat dissipating means in connection with said compressor stages; and a heat exchanger between successive stages of said compressor, fluid compressed in the lower stages thereof flowing through said heat exchangers to the next higher stages, expanded exhaust fluid from said fluid operated motor flowing past said heat dissipating means and through said heat exchangers for heat exchange relation with compressed fluid flowing therethrough.

5. Fluid compressing apparatus comprising: duct means formed for communication at one end with a source of fluid under pressure; a first heat exchanger means in said duct means for passing fluid supplied to said duct into heat exchange relation with a cooling fluid; a reaction type fluid turbine in said duct means at the downstream side of said heat exchanger means; compressor means in said duct means at the downstream side of said fluid turbine, said compressor means being operatively connected with said fluid turbine and having a plurality of radially arranged successive stages; and a second heat exchanger means between the successive stages of said compressor means, fluid from the relatively lower stages flowing through said heat exchanger means to the next higher stages, expanded exhaust fluid from said turbine flowing through said second heat exchanger means to cool the fluid between successive stages of compression.

6. In a fluid compressor, the combination of: shaft means supported for rotary movement; a reaction type turbine wheel fixed for rotation with said shaft means; means for directing compressed fluid to said turbine wheel to effect rotation of said shaft means; a plurality of successive centrifugal compressor stages having rotors fixed for rotation with said shaft means; heat exchanger means between the adjacent stages of said successive compressor stages; and means for conducting expanded fluid exhausted from said turbine wheel to and progressively passing the same through the heat exchanger means disposed between said successive compressor stages.

References Cited in the file of this patent

UNITED STATES PATENTS

| | | | |
|---|---|---|---|
| 515,585 | Hill | Feb. 27, | 1894 |
| 1,488,171 | Savidge | Mar. 25, | 1924 |
| 1,751,537 | Vianello | Mar. 25, | 1930 |
| 2,409,159 | Singleton | Oct. 8, | 1946 |
| 2,474,410 | Aue | June 28, | 1949 |
| 2,572,711 | Fischer | Oct. 23, | 1951 |
| 2,678,542 | Stanton | May 18, | 1954 |
| 2,751,144 | Troendle | June 19, | 1956 |
| 2,767,561 | Seeger | Oct. 23, | 1956 |
| 2,893,204 | Anderson et al. | July 7, | 1959 |

FOREIGN PATENTS

| | | | |
|---|---|---|---|
| 810,898 | Germany | Aug. 13, | 1951 |